United States Patent [19]

Flygstad

[11] Patent Number: 4,727,585

[45] Date of Patent: Feb. 23, 1988

[54] ADJUSTABLE TENSION SUPPORT BAND FOR HEADSET

[75] Inventor: Dean W. Flygstad, Apple Valley, Minn.

[73] Assignee: Telex Communications, Inc., Minneapolis, Minn.

[21] Appl. No.: 934,125

[22] Filed: Nov. 24, 1986

[51] Int. Cl.[4] .......... H04M 1/05

[52] U.S. Cl. .......... 381/183; 381/187; 2/209

[58] Field of Search .......... 381/183, 187; 2/209

[56] References Cited

U.S. PATENT DOCUMENTS

| | | | |
|---|---|---|---|
| 1,167,368 | 1/1916 | Adams-Randall | 381/183 |
| 1,546,567 | 7/1925 | Childress | 381/183 |
| 3,148,376 | 9/1964 | Aileo | 2/209 |
| 3,272,926 | 9/1966 | Falkenberg | 381/183 |
| 3,447,160 | 6/1969 | Teder | 381/183 |

FOREIGN PATENT DOCUMENTS

| | | | |
|---|---|---|---|
| 108644 | 1/1928 | Austria | 381/183 |
| 407548 | 12/1924 | Fed. Rep. of Germany | 381/183 |
| 446230 | 6/1927 | Fed. Rep. of Germany | 381/183 |
| 126928 | 7/1928 | Switzerland | 381/183 |

*Primary Examiner*—Jin F. Ng
*Assistant Examiner*—Danita K. Byrd
*Attorney, Agent, or Firm*—Sturm & Baker, Ltd.

[57] ABSTRACT

Apparatus for adjustably varying the tension intermediate the downwardly depending ends of a spring headband in a headset includes a longitudinally extending spring member having an arcuate shape and radius less than the intermediate portion of the headband, that is disposed on the top of the intermediate portion of the headband and stationarily connected to the headband at one end, a tension adjusting slider is disposed around the headband and the spring member for longitudinal movement so that the tension intermediate the lower ends of the headband is varied as the slider is repositioned.

11 Claims, 8 Drawing Figures

ADJUSTABLE TENSION SUPPORT BAND FOR HEADSET

FIELD OF THE INVENTION

This invention relates generally to communications headsets and is more particularly directed to apparatus for adjustably varying the tension exerted by a headband disposed across the top of the head of a user, intermediate the lower ends thereof.

PRIOR ART

The prior art is replete with various and sundry apparatus and mechanisms for varying the tension exerted intermediate the downwardly depending ends of a headband on a communications headset. For example, a two-part headband has been provided with upwardly, outwardly extending portions separated by a coil spring and a screw-threaded member extending therethrough with suitable threaded fasteners disposed to vary the length of the coil spring and thereby adjust the tension of the downwardly depending ends of the headband. Other adjustments may simply be made by bending and reforming a malleable headband.

SUMMARY OF THE INVENTION

My invention is comprised of a resilient semi-circular headband having downwardly depending lower ends for supporting communications headset earcups and/or apparatus for engaging the sides of the head of a user and being formed with a predetermined radius across the intermediate section and an overlying member of like resilient material to provide a spring action to tend to maintain a predetermined configuration, formed of a radius less than that of the intermediate portion of the headband and disposed thereon with one end in stationary engagement therewith and the other end overlying but not connected to the headband and providing a slider surrounding the intermediate portion of the headband and the overlying member so that moving the slider longitudinally of the overlying member and the intermediate portion of the headband provides an additional force tending to cause the intermediate portion of the headband to assume the radius of the overlying member and thereby vary the tension intermediate the downwardly depending ends of the headband.

DESCRIPTION OF THE ILLUSTRATED EMBODIMENT

Figure 1:
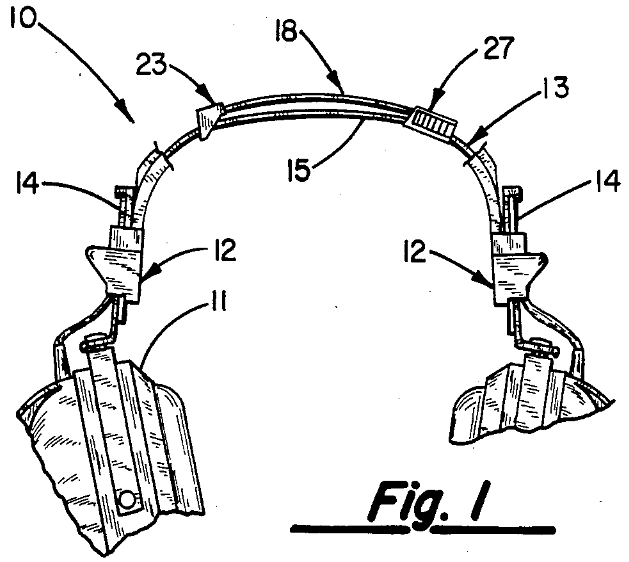
FIG. 1 is a front fragmentary sketch of a communications headset embodying the principles of my invention.
Figure 2:
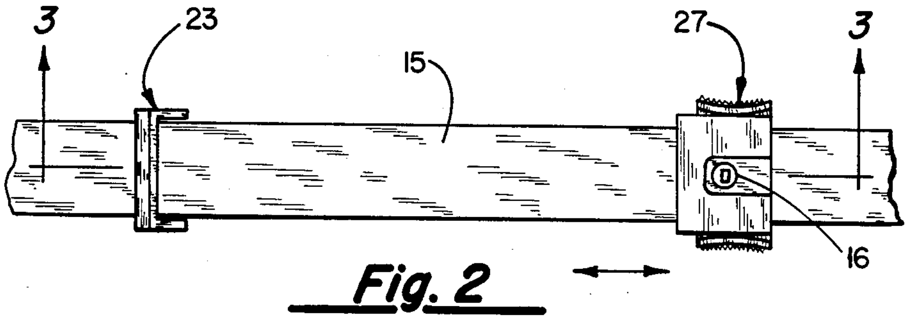
FIG. 2 is a bottom fragmentary plan view of the apparatus of FIG. 1.

Referring now to the drawings in which like elements have been identified by like reference characters, my invention is shown as incorporated into a communications headset 10 having a pair of earcups 11 disposed below the lower ends 14 of a headband 13 through suitable suspension means 12.

Headband 13 further includes a top intermediate section 15 having an aperture 16 extending therethrough. Headband 13 is of generally rectangular cross-section, and is preferably comprised of material exhibiting spring-like or resilient characteristics such that it will tend to maintain the "C" shape into which it has been formed.

A tension spring member 18, having a sliding end 19 and a stationary end 20 from which a hook or ear 21 depends downwardly, is shown disposed in overlying relationship on top of the intermediate portion of headband 13. Tension spring 18 is preferably comprised of material exhibiting spring-like or resilient characteristics and is formed to normally assume an arcuate side configuration of lesser radius than the intermediate portion of headband 13.

Tension spring 18 is disposed in overlying relationship on the intermediate portion 15 of headband 13 by inserting the hook, or ear 21, into aperture 16. The other end of tension spring 18 is disposed in a closed-end slot 24 in a retainer 23.

An adjustment slider 27 is shown having a slot 28 extending therethrough and disposed over top intermediate portion 15 on headband 13 and tension spring 18, and includes a downwardly opening slot 29 at one end to act as a stop for restricting motion of slider 27 beyond stationary end 20 of tension spring 18.

Retainer 23 is provided with slot 24 for frictionally receiving and engaging sliding end 19 of tension spring 18 and a second slot 25 for slidable disposition on intermediate section 15 of headband 13.

Figure 3:
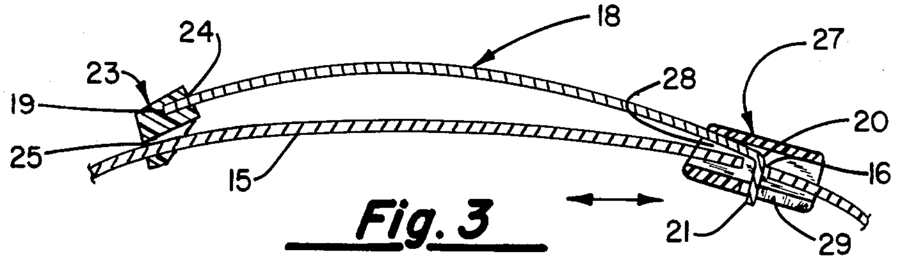
FIG. 3 is a sectional view thereof taken along section line 3—3 on FIG. 2.
Figure 4:
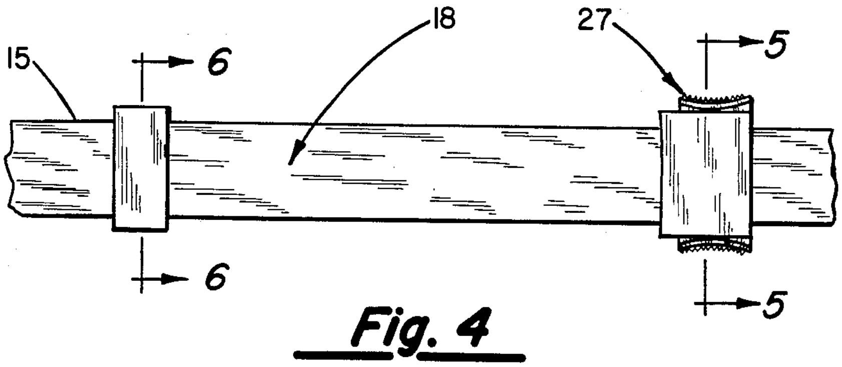
FIG. 4 is a top fragmentary plan view of the apparatus of FIGS. 2 and 3.
Figure 5:
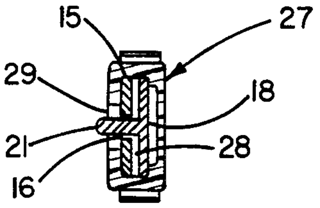
FIG. 5 is a sectional view taken along section line 5—5 on FIG. 4.
Figure 6:
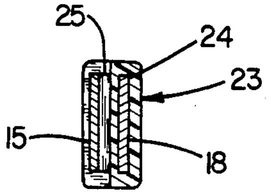
FIG. 6 is a sectional view taken along section line 6—6 on FIG. 4.

In assembly, tension spring 18 is disposed over headband 13 with ear 21 extending through aperture 16; slider 20 is moved along the length of headband 13 and over the sliding end 19 of tension spring 18 to the position shown in FIG. 3 and retainer 23 is moved along headband 13 through slot 25 for frictional engagement and connection to sliding end 19 of tension spring 18 in slot 24.

Another mode of combining the elements of my invention may occur to those skilled in the art as embodying a reversal of the position of tension spring 18 to a position underneath headband 30 so that spring 18 is oriented upwardly.

Figure 7:
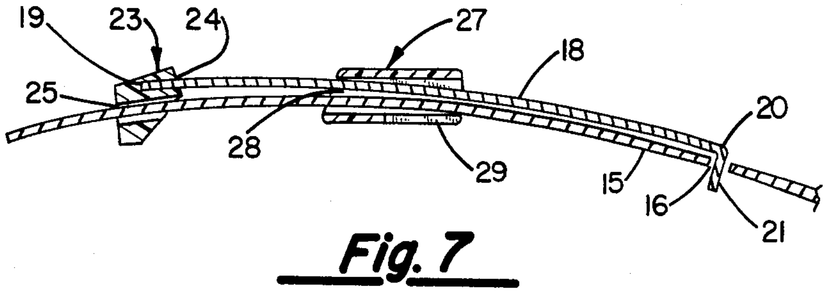
FIG. 7 is a side sectional fragmentary view like that of FIG. 3 and illustrating the relationship of the elements of my invention in a further status.
Figure 8:
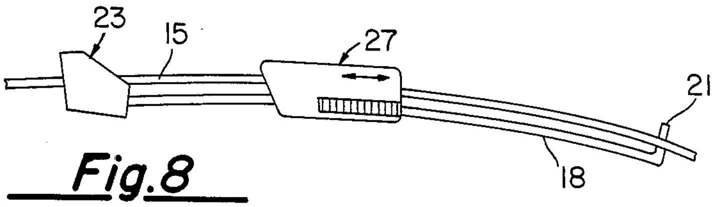
FIG. 8 is fragmentary side elevational view illustrated a further embodiment of my invention.

One way to effect an adjustment of tension of the lower ends 14 of headband 13 is to grasp the lower ends and move them toward one another and move slider 27 toward the sliding end 19 of tension spring 18 to, for example, the intermediate position illustrated in FIG. 7.

I claim:

1. An adjustable headband tensioner for a headset comprising in combination;

an arcuate shaped, elongated spring headband having means at each end for supporting a headphone ear cup;

coaxially disposed, longitudinally elongated spring means having two ends and one of said ends stationarily disposed on said headband and having a longitudinally arcuate shape of lesser radius than said headband; and adjusting means having a slot dimensioned to slidably receive said headband and said spring means and operable to be slidably positioned intermediate the ends of said spring means.

2. The subject matter of claim 1 in which connecting means are disposed intermediate the other end of the spring means and the headband.

3. The subject matter of claim 1 or 2 in which the adjusting means includes a downwardly, longitudinally extending slot adjacent one end.

4. The subject matter of claim 1 or 2 in which the spring means exhibits a greater spring force than the headband.

5. The subject matter of claim 1 or 2 in which the spring means is disposed underneath the headband and the spring means is oriented upwardly.

6. The subject matter of claim 1 or 2 in which the spring means is disposed on top of the headband and the spring means is oriented downwardly.

7. The subject matter of claim 3 in which the spring means exhibits a greater spring force than the headband.

8. The subject matter of claim 3 in which the spring means is disposed underneath the headband and the spring means is oriented upwardly.

9. The subject matter of claim 4 is which the spring means is disposed underneath the headband and the spring means is oriented upwardly.

10. The subject matter of claim 3 in which the spring means is disposed on top of the headband and the spring means is oriented downwardly.

11. The subject matter of claim 4 in which the spring means is disposed on top of the headband and the spring means is oriented upwardly.

* * * * *